United States Patent [19]
Petschauer

[11] Patent Number: 5,827,601
[45] Date of Patent: Oct. 27, 1998

[54] LARGE-FORMAT FIRECLAY REFRACTORY BRICK, IN PARTICULAR BOTTOM BLOCK IN A TIN BATH

[75] Inventor: Hans Petschauer, Grossalmerode, Germany

[73] Assignee: VGT Industriekeramik GmbH, Grossalmerode, Germany

[21] Appl. No.: 740,795

[22] Filed: Nov. 1, 1996

[30] Foreign Application Priority Data

Nov. 3, 1995 [DE] Germany ..................... 195 40 944.2

[51] Int. Cl.$^6$ .................................................. B32B 3/28
[52] U.S. Cl. .................... 428/167; 428/192; 428/220
[58] Field of Search .................................. 428/167, 172, 428/130, 149, 220, 192; 52/605; 266/263

[56] References Cited

U.S. PATENT DOCUMENTS

| | | | |
|---|---|---|---|
| 3,597,892 | 8/1971 | Farrington | 52/579 |
| 4,151,693 | 5/1979 | Harvey | 52/405 |

FOREIGN PATENT DOCUMENTS

| | | |
|---|---|---|
| 0 453 886 A1 | 10/1991 | European Pat. Off. . |
| 2 021 877 | 10/1969 | France . |
| 1 950 045 | 4/1970 | Germany . |
| 2 053 903 | 10/1970 | Germany . |

OTHER PUBLICATIONS

Sprechsaal vol. 127, No. 10, 1994, pp. 350–353.
Feuerfestkunde by Friedrich Harders and Sigismund Kienow, 1960, p. 486.

*Primary Examiner*—Donald Loney
*Attorney, Agent, or Firm*—Thomas, Kayden, Horstemeyer & Risley

[57] ABSTRACT

A large-format fireclay refractory brick (1), in particular bottom block for a tin bath, made of material comprising $Al_2O_3$ and $SiO_2$, and having a top surface (3) for contacting the tin bath, is configured to include a phase (13) extending around the periphery of the top surface (3) so that cracking of the top surface edges of abutting bricks lining the tin bath caused by thermal expansion is reduced.

8 Claims, 1 Drawing Sheet

LARGE-FORMAT FIRECLAY REFRACTORY BRICK, IN PARTICULAR BOTTOM BLOCK IN A TIN BATH

FIELD OF THE INVENTION

The invention relates to a large-format fireclay refractory brick, in particular bottom block in a tin bath, made of a material from the system $Al_2O_3$—$SiO_2$, consisting of a block having a top surface contacting the tin bath. Such large-format fireclay refractory bricks have the form of a square stone block with a surface contacting the tin bath when in use. All of the six surfaces of such large-format fireclay refractory bricks are subject to a completion by a grinding operation after firing, whereby the desired dimensions result.

BACKGROUND OF THE INVENTION

Such large-format fireclay refractory bricks serving for a coating of the steel construction and being made from a material of the system $Al_2O_3$—$SiO_2$, are known from DE 42 06 734 C2 and its related U.S. Pat. No. 5,407,875, issued on Apr. 18, 1995. The here interesting part of the glass producing facility has a steel construction in its lower region, the steel construction being coated with large-format fireclay refractory bricks. Thereby a production tub is formed being filled with liquid tin. The melted glass is poured out on the surface of the tin bath. The glass expands on the surface of the tin bath and is drawn as a thin band with a substantial width over the surface of the tin bath. This is the known way of manufacturing flat glass according to the float technique. The flat glass contains about 15% $Na_2O$. $Na_2O$ diffuses into the melted metal at the contacting surface between the glass and the liquid tin. In the tin bath sodium and atomic oxygen appear in a solved manner. The solubility of sodium and atomic oxygen in tin is a function of the temperature. Manufacturing flat glass temperatures of about 1200° C. to 600° C. occur. Parts of the tin containing sodium contact the surface of the blocks of the fireclay refractory bricks due to thermically and mechanically induced floating of the liquid tin in the tin bath. Thereby an exchange of sodium occurs between the tin and the fireclay refractory bricks. The atomic sodium penetrates into the refractory material and reacts first on the siliciumdioxide of the glass phase of the fireclay refractory bricks generating sodiumoxide. Due to the reduction of phases containing sodiumdioxide the reduced parts of the fireclay refractory bricks show a grey to black colour.

The known fireclay refractory bricks being used in such glass producing facilities may have a length of 1000 mm, a width of 600 mm and a height of 300 mm. They are made from grains of different grading, clay and alkalialumosilicate. After firing mainly mullite, a little amount of cristoballite, and a glass phase are present. The amount of the glass phase of such a fireclay refractory brick is determined by the amount of sodiumoxide and potassiumoxide. These oxides substantially influence the chemical composition of the glass phase. This chemical composition is important for the forming of the kind of alumosilikate—nepheline or albite—during the presence of metallic sodium in layers close to the surface of the fireclay refractory brick. The thermical expansion factor of nepheline is about four times as much as the factor of mullite. This results in an enlargement and in a growing of the layers of the fireclay refractory brick being adjacent to the surface contacting the tin bath. Thereby these layers contact each other due to the rectangular shape of the bricks. Tension occurs.

On the other hand it is necessary to maintain the gaps between the grinded side surfaces of the fireclay refractory bricks as small as possible and thereby sealed in order to prevent the downward passage of the melted tin. Otherwise this would result in a damage of the steel construction holding the fireclay refractory bricks. Since the penetrating of the liquid tin in the gap cannot be avoided in all cases it is the steel construction which is cooled in order to freeze the liquid tin.

Due to the increase of volume of the layers of the bricks contacting the tin bath chipping off occurs with respect to these layers generating at the corners and edges of the surfaces contacting the tin bath. Since the ceramic material of the fireclay refractory bricks has a lower relative density than the tin floating of the chipped off material from the bricks within the tin bath in upward direction occurs. This may cause substantial trouble in the production of the flat glass.

SUMMARY OF THE INVENTION

It is the object of this invention to provide a large-format fireclay refractory brick of the type mentioned above, which has a reduced trend to chip off when used as coating in a tin bath.

According to the invention, this object is realized with a fireclay refractory brick of the type mentioned above wherein the block comprises a beveled edge or perimeter groove, hereinafter "a phase," surrounding the top surface contacting the tin bath.

The invention is based on the idea of arranging a surrounding phase extending around the four edges of the top surface contacting the tin bath, on the idea of preventing the layers contacting the tin bath to press against each other when coating the steel construction, and on the idea of permitting an increase of volume without generation of stresses, since the penetration of atomic sodium into the material of the fireclay refractory brick cannot be avoided. In fact by the phase and the gusset having a doubled cross section formed between the adjacent bricks the possibility of an attack with respect to the penetration of the atomic sodium is favoured, but those parts of the side surface can be contacted by the atomic sodium which are not aligned to the top surface of the brick. These parts of the side surfaces do not increase the top surface of the brick. The new refractory bricks or blocks are mounted in the steel construction side by side without mortar showing a joint with respect to thermal expansion. Thus, the side surfaces of the bricks contact each other directly when the production runs. The brick having rectangular angles except the phases will expand under the influence of temperature so that they deform in a slight trapezoidal cross section due to the gradient of temperature. A sealing zone occurs beginning at the bottom of the phase or the gusset respectively formed between two adjacent bricks. Advantageously this sealing zone is located lower than the top surface of the brick contacting the tin bath resulting in a very efficient sealing preventing the penetration of the liquid tin in downward direction. The increase in volume at this point is used for sealing purposes. Thus it is made good use of the new and inventive phase, although the use of a phase at this point is not obvious with respect to the desired sealing. But due to the arrangement of the phase tension and stresses of the bricks side by side are located with distance to the top surface in the interior of the bricks. The floating of the liquid tin is reduced in the gussets compared with the top surface so that at this point a fewer amount of atomic sodium meets the free part of the side surfaces.

One or several grooves may be located in the top surface contacting the tin bath, the grooves subdividing the top surface into a plurality of small-format surfaces. This measure is particularly useful for very large-format bricks. The large top surface of those bricks is subdivided into a plurality of smaller top surfaces which cannot press against each other due to the arrangement of the grooves. Thus, an increase of volume is still better permitted and the trend of the layers to chip off is further reduced. In general, the arrangement of grooves should be performed only in addition to the arrangement of the surrounding phase.

The grooves may have a rectangular cross section. The arrangement of grooves having a rectangular cross section gives a simple possibility of manufacturing after firing the large-format fireclay refractory bricks.

The grooves can have a width of about 3 to 5 mm. The depth normally is between 5 and 20 mm. Generally the arrangement of the grooves is such not to meet the bores necessary for fixing the bricks to the steel construction.

The phase has a greater depth compared with the width, i.e. the distance of the edge removed by grinding in the direction of height of the brick is larger than the distance of this removed edge in the direction of length or width of the top surface. The shape of this phase and the thus generated shape of the gusset respectively is designed in a manner so that a sealing or contacting zone is generated advantageously used for sealing purposes and located with distance to the plane in which the top surface is positioned. Adapted to a fireclay refractory brick having a length of about 960 mm, a width of about 600 mm and a height of about 300 mm the phase should have a depth of about 5 to 20 mm and a width of about 1 to 8 mm. The depth of the phase thereby is greater than the height of the thickness of the known layers chipping off.

Advantageously, the phase may be produced by grinding. Thus, the production of the phase may be easy performed, since all of the surfaces have to be grinded to reach the desired dimensions of the fireclay refractory brick.

But the grooves can be made by a sawing operation. This operation is easy also.

BRIEF DESCRIPTION OF THE DRAWINGS

The invention is described in more detail with respect to preferred embodiments. The drawings show.

DETAILED DESCRIPTION

Figure 1:
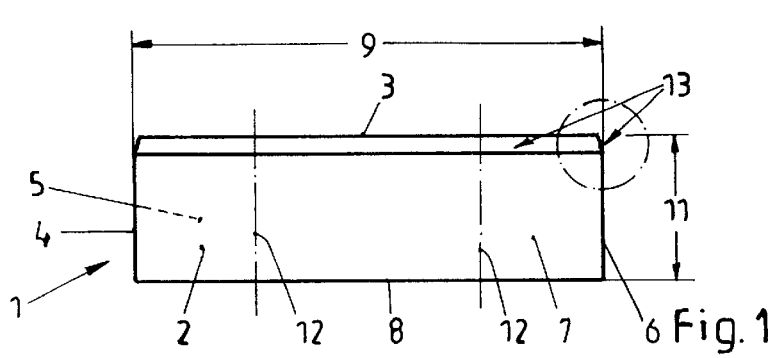
FIG. 1 a side view of a first embodiment of a fireclay refractory brick.

The fireclay refractory brick illustrated in FIG. 1 has a block 2 in form of a square stone block and parallelepipedon respectively. The block comprises six surfaces, i.e. a top surface 3, which contacts the tin bath, four side surfaces 4, 5, 6, 7 and a bottom surface 8 facing the steel construction of the glass melting device, the steel construction being equipped with said fireclay refractory bricks 1. The fireclay refractory brick 1 has a length 9, a width 10 and a height 11. Since it is a large-format refractory brick 1 it has a length 9 of about 1000 mm, a width 10 of about 600 mm and a height 11 of about 300 mm. It is clear that such large-format fireclay refractory bricks 1 may be manufactured having different dimensions also. The fireclay refractory brick 1 has bores extending over the height 11, symbolized by lines 12. These bores serve for fixing the fireclay refractory brick 1 to the steel construction in order to prevent a floating of the fireclay refractory brick 1 in the tin bath.

Figure 2:
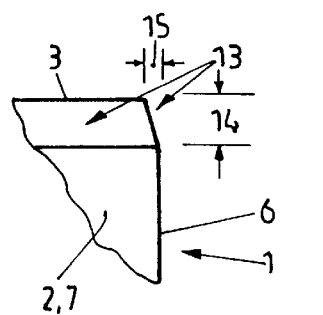
FIG. 2 a detail of the illustration of FIG. 1.

The block 2 of the fireclay refractory brick 1 comprises a phase 13 extending around the edges of the top surface 3 contacting the tin bath, i.e. an inclined flattening as illustrated in FIG. 2 as far as the right upper edge of the fireclay refractory brick of FIG. 1 is concerned. The phase 13 extends around the four edges of the top surface 3. It may be produced by grinding the parallelepipedon-shaped block 2. The phase 13 has a depth 14 of about 5 to 20 mm in the direction of the height 11 of the block and a width 15 of about 1 to 8 mm in the direction of the length 9 or the width 10 respectively, always measured from the edge prior to grinding the phase 13.

Figure 3:
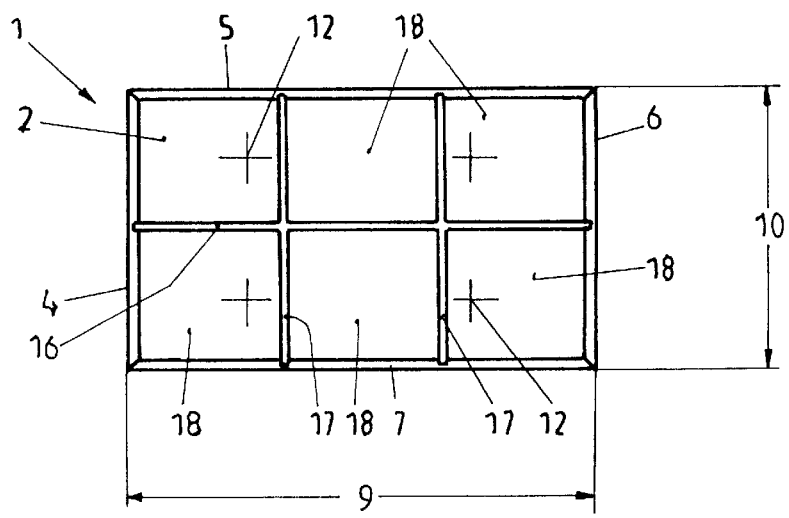
FIG. 3 a top view of a second embodiment of a fireclay refractory brick.

FIGS. 1 and 2 show a fireclay refractory brick 1 having only one phase 13 surrounding the top surface 3 so that the top surface area is decreased only a little by the arrangement of the phase 13. However, FIG. 3 illustrates a fireclay refractory brick 1 the block 2 of which in its top surface 3 comprises an additional longitudinal groove 16 and two transversal grooves 17 crossing the groove 16. The grooves 16 and 17 are located in a manner to separate the large-format top surface 3 of the block 2 into six small-format surfaces 18 of equal or nearly equal size. The grooves 16 and 17 are positioned not to intersect the bores according to the lines 12. Normally the grooves 16 and 17 are of rectangular cross section and have a depth possibly reaching the depth 14 of the phase 13. In general the width of the grooves is 3 to 5 mm. Smaller surfaces occur by separating the top surface 3 into small-format surfaces 18 not contacting each other. The generation of tension due to volume increase of layers adjacent to the top surface 3 of the block 2 is thereby reduced. Thus, the danger of chipping off is substantially decreased with those fireclay refractory bricks 1 used in glass melting devices.

Figure 4:
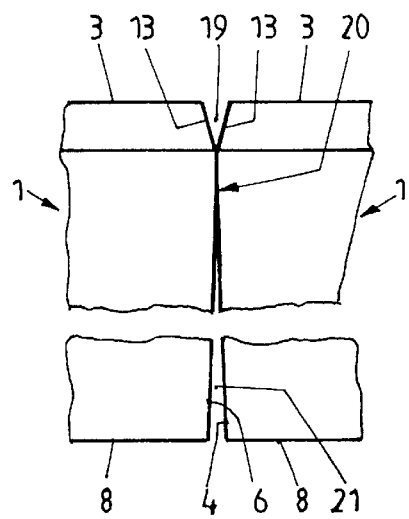
FIG. 4 a side view showing parts of adjacent bricks.

FIG. 4 shows a side view of two fireclay refractory bricks 1 arranged side by side. A gusset 19 having a doubled cross section still being larger in depth than in width is formed by the two phases 13. Adjacent fireclay refractory bricks 1 will deform with respect to the influence of temperature according to the gradient of temperature changing with the height. Thus, the fireclay refractory bricks deform to a trapezoidal cross section. A sealing zone 20 beginning at the bottom of the gusset 19 or the phase 13 respectively and declining in a certain amount in the direction of the height 11 of the block 2 is thereby created. Due to the temperature decreasing in this direction a slit 21 opening downwardly appears, which is exaggerated in scale. It is easy detectable that the fireclay refractory bricks 1 due to the influence of temperature are pressed towards each other in the neighbourhood of the sealing zone 20 so that in this region the slit 21 and the gap respectively between two adjacent fireclay refractory bricks is pressed and sealed under full contact. The pressing forces thus created do not act upon the entire height 11 of the fireclay refractory brick 1 but concentrated in the sealing zone 20. The liquid tin of the tin bath contacts the top surface 3 of the fireclay refractory brick and can penetrate the gusset 19 also. But the tin is efficiently preserved from passage in downward direction in the area of the sealing zone 20. It goes without saying that in addition further measures are taken to prevent the downward passage of the liquid tin, for example a cooling of the steel construction.

Figure 5:
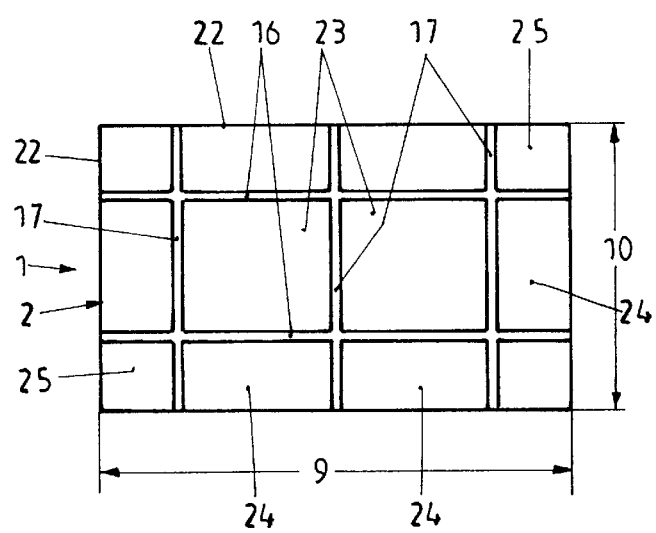
FIG. 5 a top view of a further embodiment of a fireclay refractory brick.

FIG. 5 shows a top view of a fireclay refractory brick 1 similar to FIG. 3. A surrounding phase 13 is omitted. A grid is provided having a plurality of longitudinal grooves 16 and several transversal grooves 17. The grooves 16 and 17 are located on the top surface 3 at least partly close to the edge 22 of the block. Thus, surfaces 23 and surfaces 24 being of different size are formed from the top surface 3, whereby two surfaces 24 of two adjacent bricks have the same size as one of the surfaces 23. When the fireclay refractory bricks are positioned side by side and row by row four edges of the bricks are facing each other and the four surfaces 25 have the same size as one of the surfaces 23. By the arrangement of these grooves 16 and 17 the top surface 3 facing the tin bath is substantially decreased, the generation of tension due to the influence of temperature reduced and thereby counteracted the danger of chipping off. While preferred embodiments of the invention have been illustrated and described herein, it will be apparent to those skilled in the art that variations and modifications thereof can be made without departing from the spirit and scope of the invention, as set forth in the following claims.

LIST OF REFERENCE NUMERALS

1—fireclay refractory brick
2—block
3—top surface
4—side surface
5—side surface
6—side surface
7—side surface
8—bottom surface
9—length
10—width
11—height
12—line
13—phase
14—depth
15—width
16—longitudinal groove
17—transversal groove
18—surface
19—gusset
20—sealing zone
21—slit
22—edge
23—surface
24—surface
25—surface

I claim:

1. Large-format fireclay refractory brick (1) for placement as bottom block in a tin bath, said brick being made of a material comprising $Al_2O_3$ and $SiO_2$, and each brick having a top surface (3) for contacting the tin bath, wherein each brick (1) comprises a perimeter groove (13) surrounding said top surface (3) for contacting a tin bath so that the top surfaces of adjacent brick in a tin bath are displaced from one another.

2. The brick of claim 1, wherein at least one surface groove is formed in the top surface (3) of each brick for contacting the tin bath, said surface grooves subdividing the top surface (3) of said brick into a plurality of small-format surfaces (18, 23, 24, 25).

3. The brick of claim 2, wherein said surface groove (16) has a rectangular cross section.

4. The brick of claim 3, wherein said surface groove has a width of about 3 to 5 mm.

5. The brick of claim 1, wherein said perimeter groove (13) has a depth and a width, with said depth being greater than said width.

6. The brick of claim 5, wherein the brick (1) is further defined as having a length (9) of about 960 mm, a width (10) of about 600 mm and a height (11) of about 300 mm, and said perimeter groove (13) has a depth (14) of about 5 to 20 mm and a width (15) of about 1 to 8 mm.

7. The brick of claim 5, wherein said perimeter groove is characterized by having been formed by grinding.

8. The brick of claim 4, wherein said surface groove (16) is characterized by having been formed by a sawing operation.

* * * * *